US008887665B2

(12) United States Patent
Rocker et al.

(10) Patent No.: US 8,887,665 B2
(45) Date of Patent: Nov. 18, 2014

(54) VISCOUS PET FOOD DISPENSING APPARATUS

(71) Applicants: Karla S. Rocker, St. Joseph, MO (US); Richard Sailors, Village of Loch Lloyd, MO (US)

(72) Inventors: Karla S. Rocker, St. Joseph, MO (US); Richard Sailors, Village of Loch Lloyd, MO (US)

(73) Assignee: Karla S. Rocker, St. Joseph, MO (US)

( * ) Notice: Subject to any disclaimer, the term of this patent is extended or adjusted under 35 U.S.C. 154(b) by 26 days.

(21) Appl. No.: 13/714,611

(22) Filed: Dec. 14, 2012

(65) Prior Publication Data

US 2013/0104808 A1     May 2, 2013

Related U.S. Application Data

(63) Continuation-in-part of application No. 12/862,754, filed on Aug. 24, 2010, now Pat. No. 8,342,128.

(60) Provisional application No. 61/236,374, filed on Aug. 24, 2009.

(51) Int. Cl.
*A01K 5/01* (2006.01)
*A01K 1/10* (2006.01)

(52) U.S. Cl.
CPC ............. *A01K 5/0128* (2013.01); *A01K 5/0135* (2013.01); *A01K 5/0114* (2013.01)
USPC .......................................... 119/61.2; 119/61.5

(58) Field of Classification Search
USPC ................ 220/578; 222/405, 386; 119/61.54, 119/61.5, 61.53, 61.55, 61.2, 61.1, 57; 99/495, 506–508
See application file for complete search history.

(56) References Cited

U.S. PATENT DOCUMENTS

| 1,739,627 | A | * | 12/1929 | Austin | 220/719 |
| D105,367 | S | * | 7/1937 | Swordling | D7/667 |
| 2,601,767 | A | * | 7/1952 | Wall | 220/719 |
| 3,040,897 | A | * | 6/1962 | Holman | 210/244 |
| 3,313,447 | A | * | 4/1967 | Dean | 220/719 |
| 3,360,160 | A | * | 12/1967 | Dean | 220/719 |
| 3,549,044 | A | * | 12/1970 | Lerner | 220/719 |
| 3,589,340 | A | * | 6/1971 | Beliles | 119/61.54 |
| 4,831,681 | A | * | 5/1989 | Puder | 15/257.05 |
| 5,370,260 | A | * | 12/1994 | Paramski | 220/580 |
| 5,634,569 | A | * | 6/1997 | DeCoster | 220/735 |
| 5,676,275 | A | * | 10/1997 | Khattar | 220/575 |
| 5,887,544 | A | * | 3/1999 | Popelier | 119/61.54 |
| 5,971,202 | A | * | 10/1999 | Filbrun | 220/719 |
| 6,153,237 | A | * | 11/2000 | Ferguson | 426/115 |
| 6,314,911 | B1 | * | 11/2001 | Kaytovich | 119/61.5 |

(Continued)

*Primary Examiner* — Kristen C Hayes
(74) *Attorney, Agent, or Firm* — Erickson Kernell Derusseau & Kleypas, LLC

(57) ABSTRACT

An apparatus for dispensing viscous animal food includes a container and a dispensing sheet. The container includes a cavity formed by a sidewall, a concave bottom, and an open top. The sheet includes a perforated transverse wall or web with a downwardly curving profile that conforms to the concave bottom and a flange extending downwardly from the perimeter of the web. Rails are disposed along the sidewall to, along with conforming recesses in the perimeter of the sheet, guide movement of the sheet in the cavity. The flange interacts with the sidewall to resist pivotal movement of the sheet. A channel is provided about the perimeter of the concave bottom to receive the flange and enable receipt of the web on the concave bottom. Food disposed on the concave bottom is extruded through the sheet by downward forces applied by an animal during eating.

20 Claims, 7 Drawing Sheets

(56) References Cited

U.S. PATENT DOCUMENTS

D459,952 S  * 7/2002 Bellander ................. D7/667
7,487,881 B2 * 2/2009 Watzke et al. ............. 220/501
7,544,294 B2 * 6/2009 Halterman ................. 210/232
7,562,773 B2 * 7/2009 Cotsalas ................... 206/303
7,753,000 B1 * 7/2010 Turner ..................... 119/61.2
8,082,882 B1 * 12/2011 Tharp ....................... 119/60

* cited by examiner

VISCOUS PET FOOD DISPENSING APPARATUS

CROSS-REFERENCE TO RELATED APPLICATIONS

This application is a continuation-in-part of U.S. patent application Ser. No. 12/862,754, filed Aug. 24, 2010, which claims the benefit of U.S. Provisional Patent Application No. 61/236,374, filed Aug. 24, 2009, the disclosures of both of which are hereby incorporated herein in their entirety by reference.

BACKGROUND

The present invention generally relates to dispensing devices, and it is specifically directed to a dispensing device comprising, primarily, a container portion within which viscous material may be held, as well as a perforated, curved disc element through which the viscous material may be dispensed by extrusion in a somewhat controlled fashion. As will be discussed, the configuration of the present apparatus makes it particularly effective for use as a pet food dispenser.

Apparatuses for dispensing viscous materials are well known in the prior art. One pertinent example of such apparatus is found in U.S. Pat. No. 5,148,951 to Moure, et al. In fact, Moure discloses a dispensing package for gel and semi-solid cleaning and skin care compositions. The package includes a container for holding the composition and an apertured dispensing sheet that is to rest upon the composition. The perimeter of the apertured dispensing sheet is configured to conform to the interior geometry of the container (e.g., circular or rectangular), except that the dispensing sheet has a diameter less than the interior diameter(s) of the fully vertical or tapered walled container so that the sheet may descend downward with the diminishing level of material within the container as force is applied to the sheet and extruded material is removed.

In an embodiment of the Moure package in which the container component has tapered sidewalls, the dispensing sheet is flexible and has flexible, semicircular tabs extending outward from its perimeter. So, as the sheet advances toward the bottom of the container, its tabs, when they eventually come into contact with the converging container sidewalls, flex upward as the sheet is further forced toward the container bottom. Furthermore, if a user applies a force that distributes unevenly throughout the Moure dispensing sheet, the flexibility of the sheet's perimeter helps prevent the sheet from breaking, permanently deforming or possibly becoming misaligned within the container when a perimeter section of the sheet impinges on the container sidewall.

Another example of relevant prior art is found in U.S. Pat. No. 5,411,182 to Marte, et al. Although similar to that disclosed in Moure, a distinguishing characteristic of the apparatus described in Marte is that its corresponding dispensing element is a substantially rigid, plate-like perforated device that is non-planar in the respect that it features an alternating pattern of raised and recessed areas. The purpose of those recessed areas is to collect and retain any water, dirt, or other foreign debris that are transferred to the dispensing element by a finger or other implement that presses against it. Furthermore, the plate-like dispensing element is substantially rigid, unlike its counterpart element disclosed in Moure, in order that downward pressure applied to it is distributed fairly evenly across its entire dimensions. However, much like Moure, Marte discloses that the dispensing element may have peripheral tabs that upwardly flex upon impact with the interior sidewall of the container element.

Nevertheless, while the aforementioned and other prior art devices may be perfectly adequate for extrusion dispensing semi-solid matter at the press of a finger or other implement in a wide variety of applications, the present inventor notes that none of the prior art devices are well adapted to function specifically as pet animal feeding devices. To wit, known prior art devices are not ideally configured to dispense viscous food material in a way that is particularly accommodating to the arcuate path of the lapping motion that an animal's tongue makes to ingest food and liquid.

For example, were a substantially flexible dispensing sheet to be used (e.g., Moure) in an animal food dispensing device, downward deflection of the dispensing sheet, in response to a load applied by an animal tongue and opposing force exerted by semi-solid food material disposed below the sheet, would cause food material to primarily extrude through sheet openings located within the vicinity of the rapidly moving tongue load placement. That is because, as the sheet flexes downward, food material located within the area in which it vertically deflects is pierced through the sheet openings. However, since the tongue swipes through that area so rapidly, the sheets deflection can be quite counter productive to feeding. For one, the animal's tongue momentarily covers sheet apertures within much of the area of deflection and, therefore, inhibits food from being extruded in the deflection zone. Secondly, since load is not evenly distributed to areas outside the vicinity of tongue-sheet contact, the sheet's flexing necessitates that the animal apply greater force in order to extrude food through the sheet apertures that are momentarily outside of the contact area and unobstructed by the tongue. Furthermore, because of the quick upward return of the animal's tongue in the lapping motion, the animal is essentially required to dispense food with a first tongue motion before being able to actually gather it with a subsequent one. And because the sheet may, depending on its flexibility, quickly return to its planar profile as the tongue load is removed, much of the viscous material that was extruded in that first tongue lap my retreat back under the dispensing sheet just prior to being able to be scooped in the immediate next one. So, even though the very purpose of such a dispensing container may be to meter an animal's consumption, a flexible dispensing sheet element may actually over-restrict the container's food dispensation rate to the point of frustrating an animal.

Conversely, using a substantially rigid, planar and/or plate-like dispensing sheet of the prior art to control the output of viscous food can also be problematic. For one, the inflexibility of it may be understandably discomforting to the animal's tongue, as it presents an abrupt barrier against the tongue's downward, arcuate scooping motion. Also, dispensed food material can become aggregated along the hard-to-reach circumferential corner formed by the container sidewall(s) and outer edge of a plate-like sheet. This could ultimately cause a significant portion of the dispensed food material to be wasted, if the animal cannot retrieve it. Even worse, an animal could end up getting its tongue pinched, or even lacerated, while attempting to pry it into these perimeter areas in order to extract food. After all, there is likely to be a small gap between the rim of a dispensing sheet and the container sidewall for enabling the sheet to descend vertically within the container.

Consequently, the present inventor recognizes a need for an improved dispensing apparatus that is specially adapted to facilitate the controlled consumption of non-solid pet foods by dogs, cats, and potentially other animals, without posing the limitations and hazards of prior art extrusion dispensing apparatuses. The present invention for a viscous food dispensing apparatus substantially fulfills this need.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used in isolation to determine the scope of the claimed subject matter.

It is an object of the invention to provide a viscous material dispensing apparatus that dispenses food to a feeding animal in a controlled, yet sufficiently plentiful, manner and that does not lend itself to becoming jammed, misaligned or disassembled by the animal under any foreseeable circumstance. It is a further object of the invention to be configured so as to eliminate the risk of inducing oral injury to a feeding animal.

In one aspect of the invention, the apparatus comprises a container and a rigid, perforated dispensing sheet, as do many known prior art dispensing devices, but its dispensing sheet has a profile that is distinguishable from that of its prior art counterparts. Specifically, the perforated dispensing sheet has a non-planar, downwardly concave profile that is intended to serve at least the following two purposes: (1) to conform, to some extent, to the arcuate lapping motion that a dog or cat tongue typically makes during feeding; and (2) to cause a disproportionate amount of the viscous food material that has dispensed up through it to be exposed around its center, thereby rendering a more easily scoopable food mass at the apex of the tongue motion and encouraging the animal to not pry its tongue into any gap that may exist between the sheet and the adjacent container sidewall.

In another aspect of the invention, the apparatus's container component features a plurality of vertical rails along its interior sidewall, while conforming recesses are formed along the perimeter of its dispensing sheet component. These distinctive rails and recesses cooperate to enable the dispensing sheet to stably move downward within the container as pressure is applied by an animal's tongue and the container's contents gradually empty.

In another aspect of the invention, a pair of pull-tabs may extend up from near edges of the dispensing sheet so that a pet owner can easily lift the sheet from the container in order to refill or clean the apparatus.

In yet another aspect of the invention, the perimeter edges of the rigid dispensing sheet may be coated by a slippery material so as to enable the sheet to travel within the container without there needing to be any radial separation between the perimeter of the sheet and the interior sidewall of the container.

In another aspect of the invention, a flange is provided extending downwardly from the perimeter of the dispensing sheet. Interaction of the flange with the sidewall of the container resists pivotal movement of the sheet within the container. A corresponding channel is provided in a bottom wall of the container to receive the flange and enable the dispensing sheet to contact the bottom surface to maximize dispensation of food material disposed therebetween.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

As will become apparent from the discussion below in connection with the accompanying drawings, the present disclosure has particular applicability to apparatuses used to dispense pet food material to a feeding pet animal in a regulated manner. However, those having skill in the art should appreciate that the present disclosure has general applicability to apparatus for dispensing viscous material beyond animal feeding applications.

Figure 1:
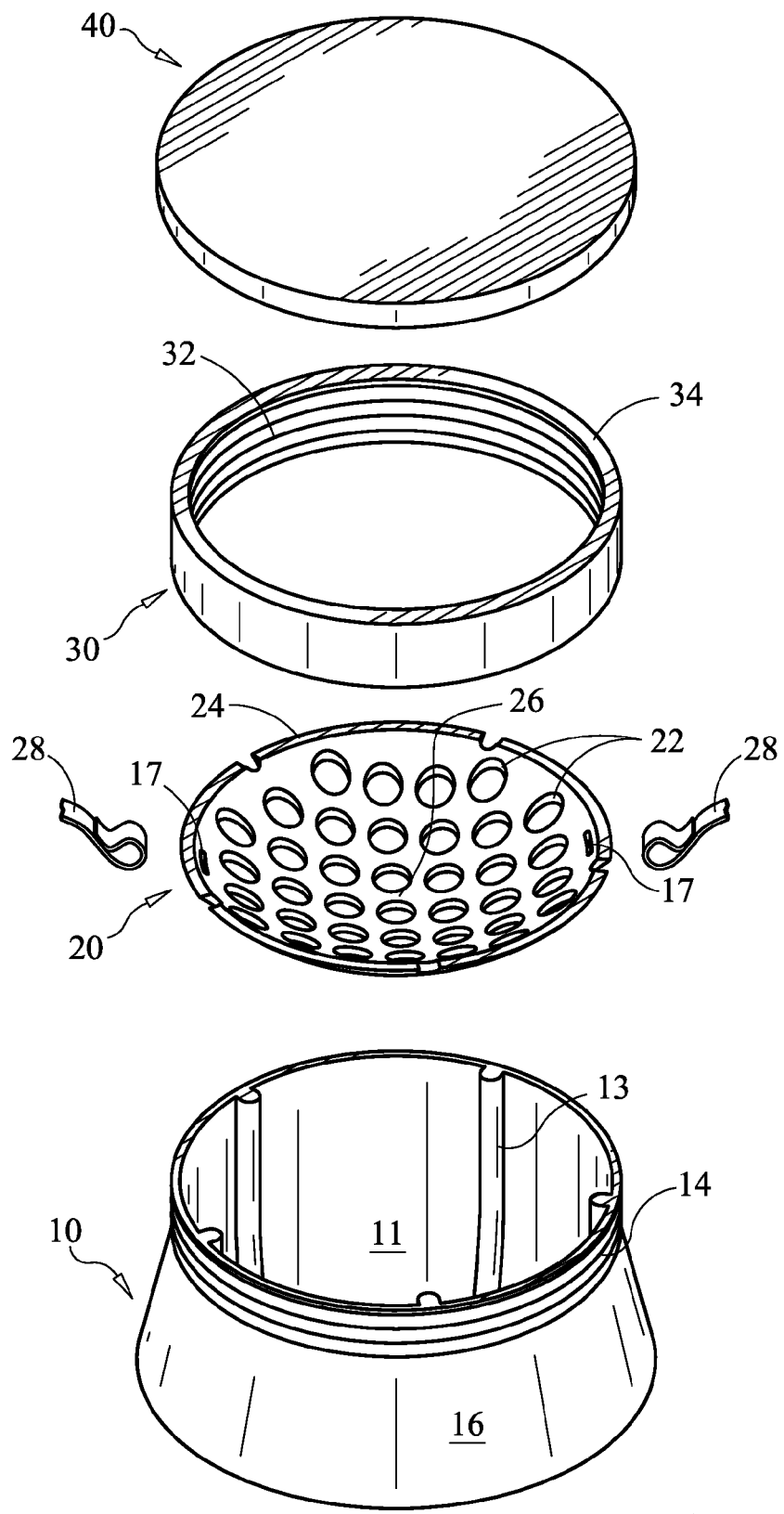
FIG. 1 is a top perspective view of a viscous pet food dispensing apparatus depicted in accordance with an embodiment of the disclosure, the apparatus being shown in a fully disassembled state and empty of any food contents.

Referring now to FIG. 1, there is illustrated an embodiment of a pet food dispensing apparatus that principally comprises: (a) a container 10 for holding viscous pet food, (b) a rigid; downwardly concave and perforated dispensing sheet 20 through which the food may be extruded; and (c) an annular ring or collar 30 for attaching to the container 10 and preventing the dispensing sheet 20 from being inadvertently (from the pet owner's perspective, anyway) displaced from the container 20. Also included in a preferred embodiment of the dispensing apparatus, and shown in FIG. 1, is a lid 40 for sealing the apparatus between feeding sessions as well as a pair of tabs 28 that enable a pet owner to grip and pull the dispensing sheet 20 up out of the collarless container 10 in order to clean the apparatus.

Figure 4:
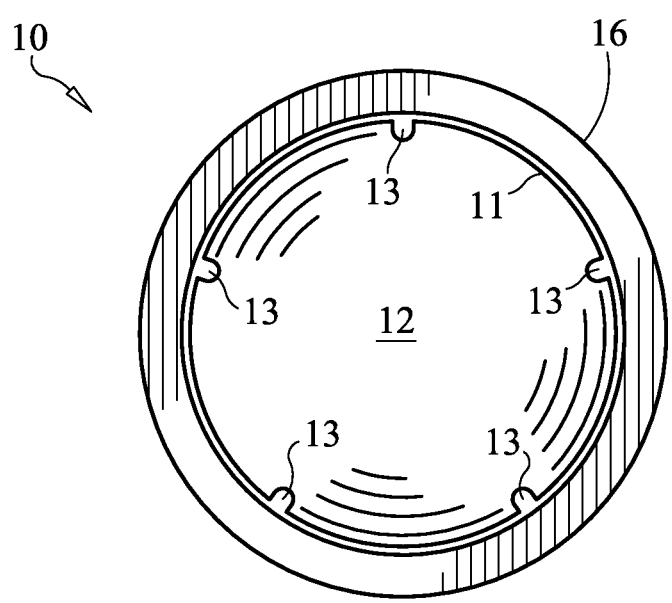
FIG. 4 is a top plan view of the container component of the dispensing apparatus.

As can be gleaned from several of the drawings, the container 20 preferably has a tapered exterior sidewall 16 that has a greater diameter at its base 15 than at its neck 14 in order to inhibit the apparatus from toppling during use, and to further improve stability, the base 15 may be disproportionately weighted by some means. However, an alternative embodiment of the container 20 may feature a substantially vertical exterior sidewall 16. In either case, as seen most clearly in FIGS. 5 & 6, the container's interior sidewall 11 has a substantially vertical and cylindrical geometry until its lower end meets the container's shallow bowl-shaped interior bottom surface 12. A plurality of evenly circumferentially spaced ribs or rails 13 runs down the interior sidewall 11 of the container 20, as shown in FIGS. 1 & 4. The rails 13 taper off at the bottom end of the sidewall 11 as the container surface slopes inward to form its bowl-shaped bottom 12. Finally, a screw thread-bearing neck 14 is at the top of the container 10.

The rigid dispensing sheet 20 has a circular perimeter, and to allow it to freely move vertically within the container 20, it has a diameter that is slightly smaller (e.g., 3 mm smaller) than the container's diameter along its cylindrical interior sidewall 11. Viscous food material passes through a plurality of openings 22 formed within the dispensing sheet 20. Preferably, these openings 22 are sized in accordance with the texture and particle size of the food material that is to be dispensed.

As previously described, the dispensing sheet 20 has a curved or concave configuration. Its concave shape allows it to at least somewhat cooperate with the arcuate scooping motion that a dog or cat's tongue typically makes during feeding. More specifically, as the animal's tongue laps along the dispensing sheet 20, the circular trough profile of the sheet 20 allows the tongue to comfortably advance down toward the bottom of that trough, effectively directing tongue-applied load toward the sheet center 26.

Figure 5:
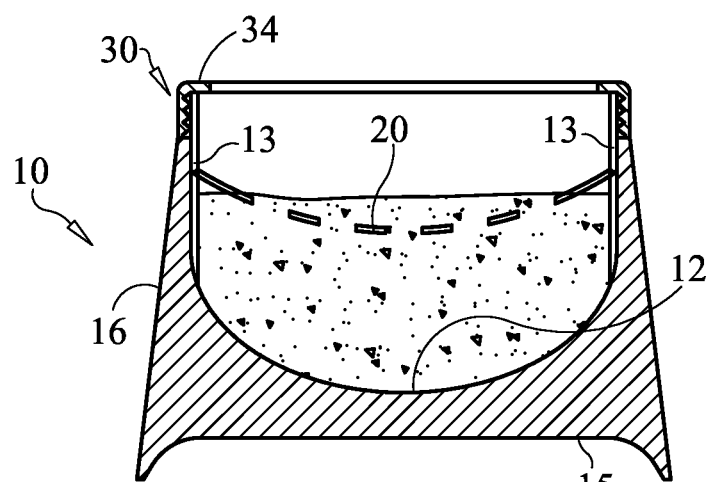
FIG. 5 is an elevational view of the apparatus being shown assembled, except that its pull-tabs and lid components are not shown, and in cross section with its container holding food material.
Figure 6:
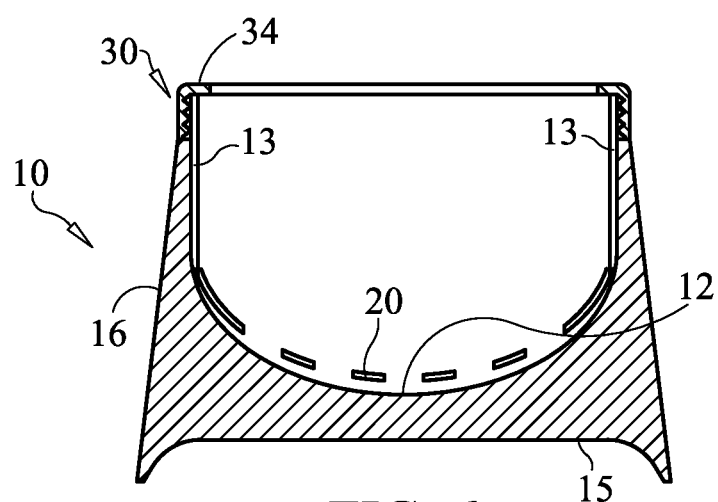
FIG. 6 an elevational view of the apparatus similar to that shown in FIG. 5, except that the container is empty of any food contents.
Figure 7:
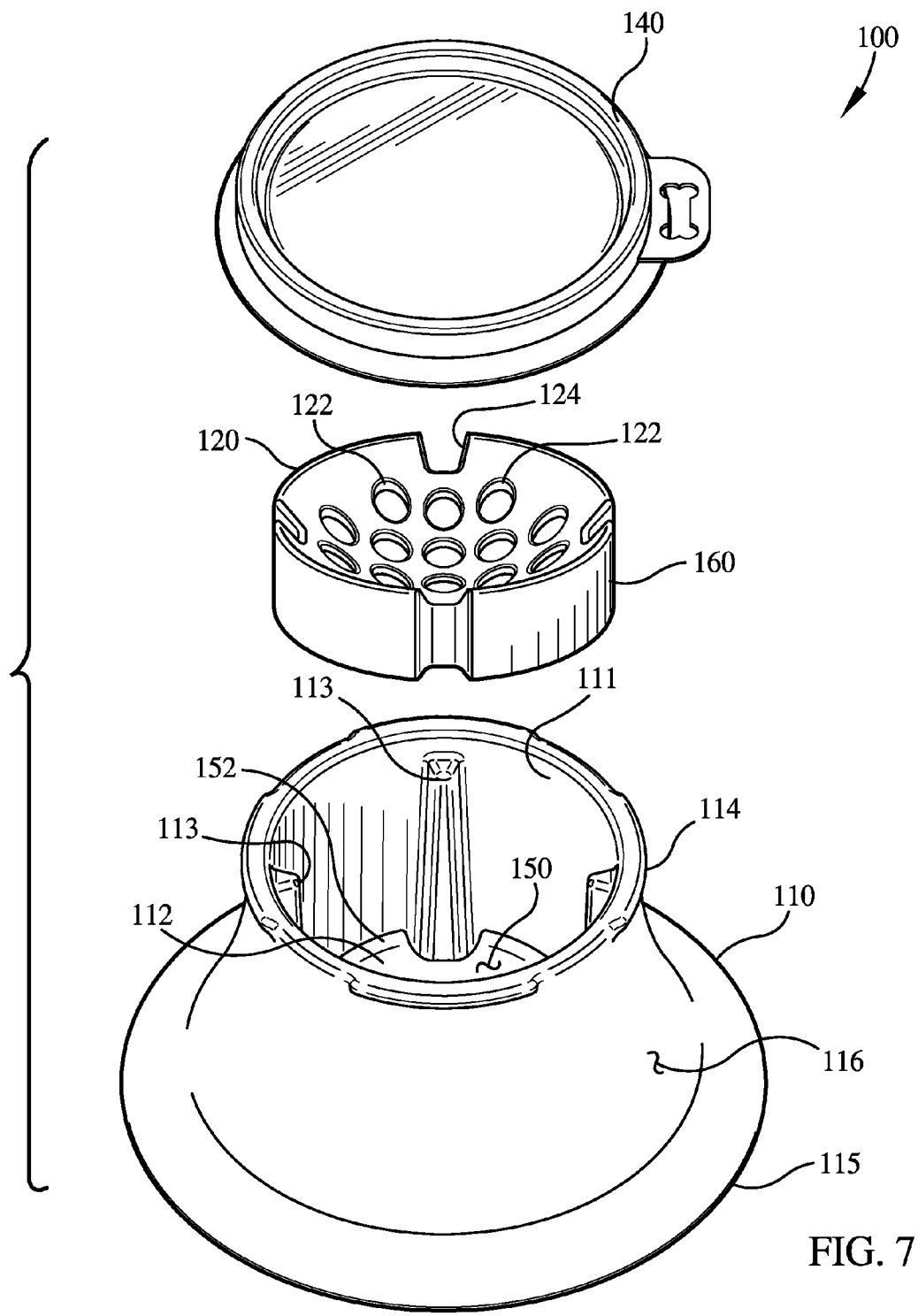
FIG. 7 is an exploded perspective view of an alternative embodiment of the viscous pet food apparatus.

This phenomenon has a couple of important effects. First, it tends to minimize any torque that the sheet 20 would experience and any friction that might be induced along its perimeter if the sheet 20 had a flatter profile and was subjected to vertical load concentrated a considerable distance from its center 26. Second, as the animal's motioning tongue presses the sheet 20 down and filters viscous material up through its openings 22, a very extractable circular trough of food forms above and about the depressed center 26 of the sheet 20, as depicted in FIG. 5. Furthermore, the animal's lapping tongue will actually gather some of the viscous composition that becomes disposed above a distal portion of the tongue's sweeping path along the dispensing sheet 20. And as a consequence of the greatest aggregation of extruded food being consistently found above the center 26 of the dispensing sheet 20, an animal will quickly learn to focus its tongue in that area. Further limiting any torque on the sheet 20 or potential friction from contact with the container sidewall 11.

Figure 3:
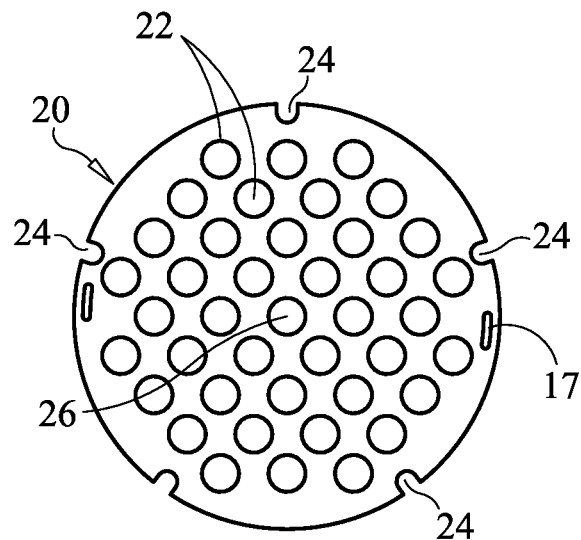
FIG. 3 is a top plan view of the dispensing sheet component of the dispensing apparatus.

Nevertheless, to even better ensure that the sheet 20 stably descends with the food level, a plurality of notches or recesses 24, as seen in FIG. 3, are formed within the sheet's perimeter to correspond with the rails 13 along the container sidewall 11. Further, to ensure that the dispensing sheet 20 is not dislodged from the container 10 during animal feeding, the collar 30 is secured to the threaded neck 14 of the container 10. The top of the collar 30 features a short inward flange 34 that will retain the dispensing sheet 20 if necessary.

The interior bottom 12 of the container 20 should conform to the profile of the dispensing sheet 20 so that substantially no food remains trapped under the sheet 20 and unable to be extracted by the animal.

To facilitate cleaning and reuse of the apparatus, a pair of opposing pull tabs 28 are positioned near the perimeter of the dispensing sheet 20. Preferably, each tab is fabricated of a disposable adhesive strip that can be slid through a slit 17, that is formed within the sheet 20 circumferentially outside of its dispensing holes 22, and then adhered to itself to form a pulling segment and a loop section that secures it to the sheet 20. Of course, those skilled in the art will appreciate that the pull-tabs 28 can comprise a wide array of materials, and their placement along and means for securing to the sheet 20 can be varied.

In an embodiment of the apparatus, a snap-fitting lid 40 places directly over either the collar 30 or the container neck 14 so that residual pet food may be air tightly stored within the container 20 between uses.

With reference now to FIGS. 7-10, an animal-food dispensing apparatus 100 is described in accordance with another embodiment of the invention. Elements of the apparatus 100 that are similar to those described above are provided with 100-series reference numerals that include matching second and third digits, e.g. the container 110 of the apparatus 100 and the container 10 described above. These components and features are not described in detail again here except where necessary to an understanding of embodiments of the apparatus 100.

Figure 2:
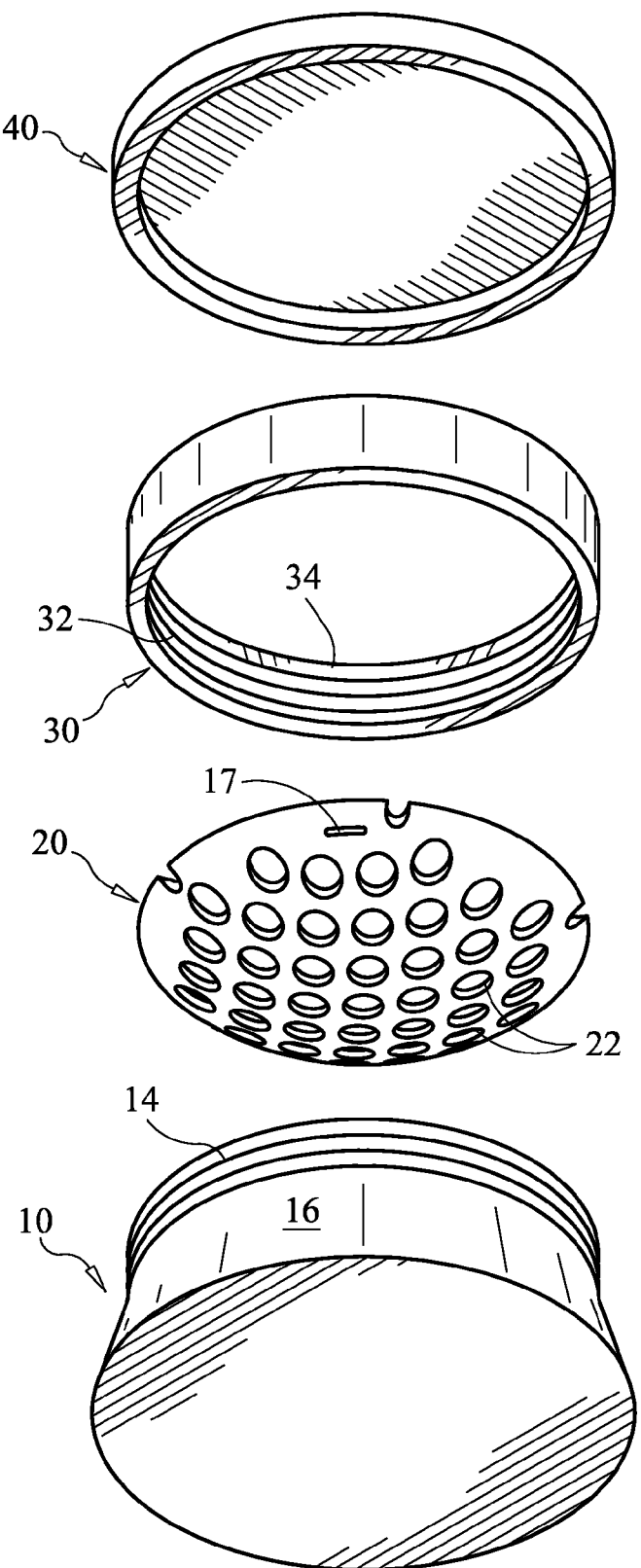
FIG. 2 is a bottom perspective view of the dispensing apparatus of FIG. 1, except that its pair of pull-tab components are not included.

The animal-food dispensing apparatus 100 includes a container 110, a dispensing sheet 120, and may optionally include a lid 140. The container 110 provides a generally cylindrical cavity with an open top end formed by an annular interior sidewall 111 and an interior bottom surface 112. The interior sidewall 111 is generally vertically oriented but may slope radially outwardly at a slight angle to provide a circumference that is slightly larger at the open end than near the bottom surface 112. The container 110 may also include a collar threadably engaging the container 110 like the collar 30 and the threaded neck 14 of the container 10 as shown in FIGS. 1 and 2 and described previously above.

A plurality of rails 113 are spaced radially apart about the interior sidewall 111 and extend at least a portion of the distance between the bottom surface 112 and the upper, open end of the container 110. The rails 113 each have a polygonal cross-sectional profile and taper slightly inward toward the interior sidewall 111 along their length from the bottom surface 112 toward their upper ends. The rails 113 can have a wide variety of shapes or configurations without departing from the scope of embodiments of the invention described herein.

Figure 8:
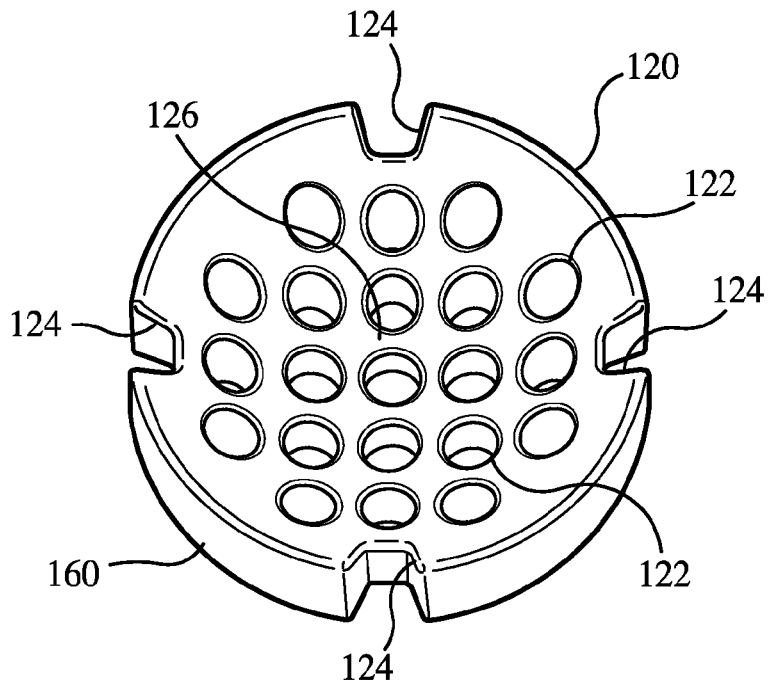
FIG. 8 is a top perspective view of a dispensing sheet of the embodiment depicted in FIG. 7.
Figure 9:
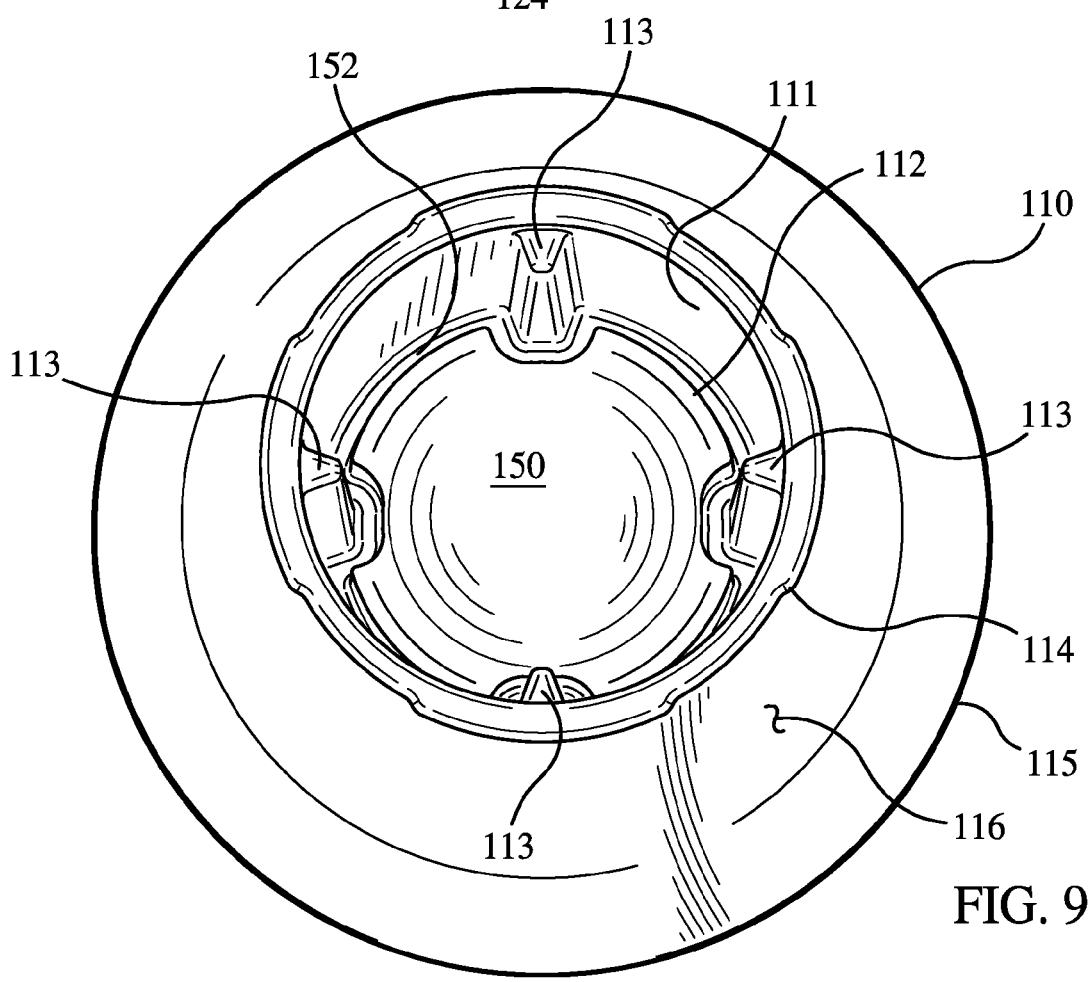
FIG. 9 is a top perspective view of a container of the embodiment depicted in FIG. 7.
Figure 10A:
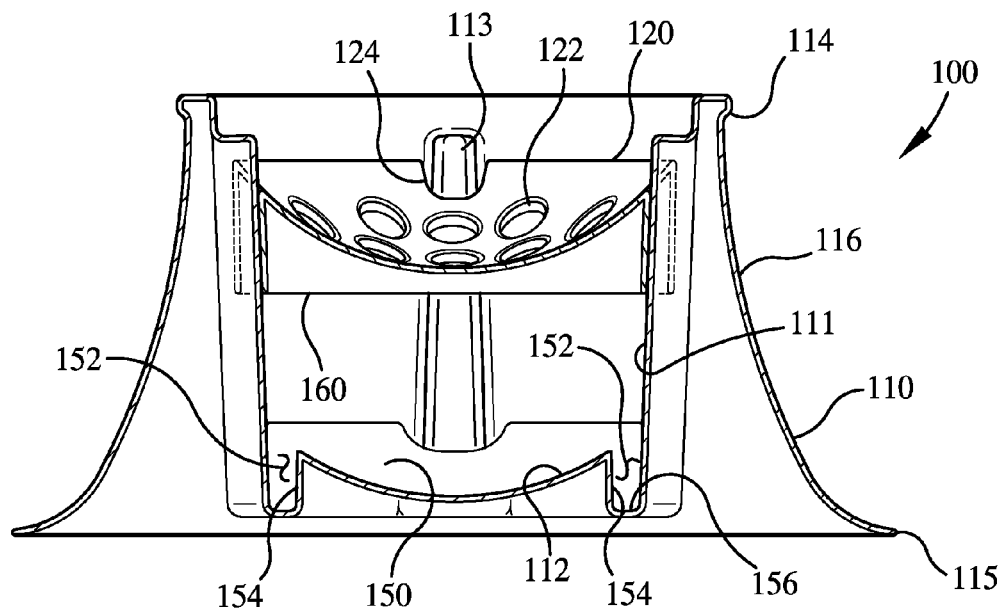
FIG. 10A is a cross-sectional elevational view of the embodiment of FIG. 7 depicting the dispensing sheet spaced apart from a bottom surface of the container.
Figure 10B:
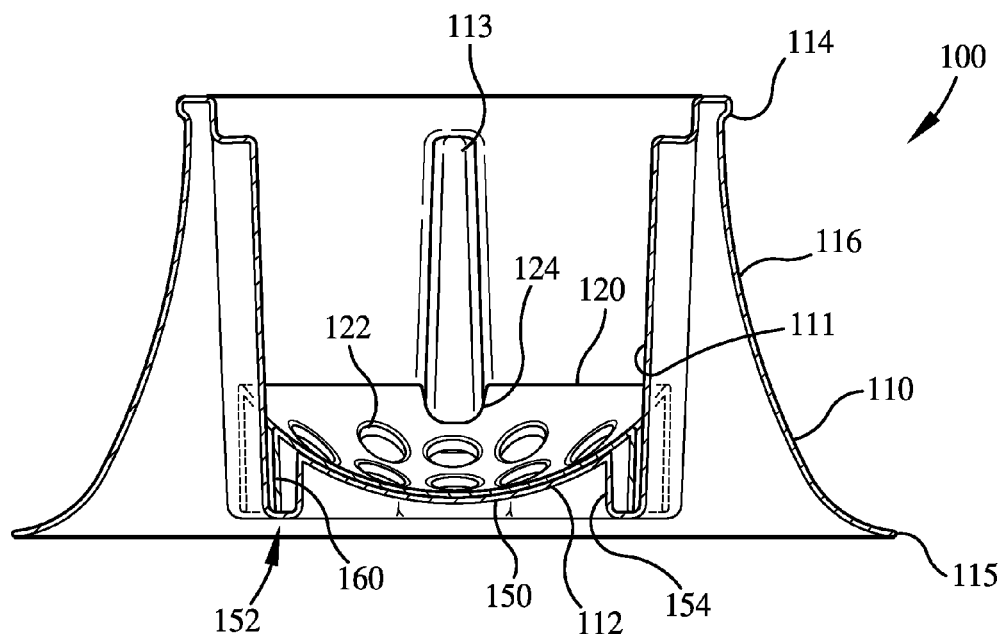
FIG. 10B is a cross-sectional elevational view of the embodiment of FIG. 7 depicting the dispensing sheet seated against the bottom surface of the container.

The bottom surface 112 comprises a central downwardly depressed or concave portion 150 and an annular channel 152 extending about the circumference of the concave portion 150 and between the concave portion 150 and the sidewall 111. As depicted in FIGS. 8-10, the concave portion 150 has a generally circular configuration that slopes downwardly toward the center thereof along an arc, curve, or line, however other shapes or configurations might be employed, e.g. ovate or polygonal shapes. Referring to FIGS. 10A and 10B, wall 154 depends downwardly from the circumference of concave portion 150 a distance to meet a lower wall 156 of the annular channel 152. As such, the annular channel 152 is formed by the wall 154, the lower wall 156, and the interior sidewall 111. The annular channel 152 is also routed around the rails 113 to maintain a generally constant channel width.

The dispensing sheet 120 includes a downwardly depressed or concave top or transverse wall or web 158 with a plurality of perforations or openings 122 extending vertically therethrough. The concavity and/or shape of the web 158 generally mirrors the shape of the central concave portion 150 of the interior bottom surface 112 of the container 110.

A plurality of notches or recesses 124 is disposed in the circumference of the dispensing sheet 120. The recesses 124 are each configured to receive a respective one of the rails 113 disposed on the sidewalls 111 of the container in a vertical sliding relation.

An annular flange 160 extends vertically downward from the perimeter of the dispensing sheet 120 a distance that is equal to or less than the depth of the annular channel 152. The annular flange 160 is configured to be received by the annular channel 152. The annular flange 160 extends around the full perimeter of the dispensing sheet 120 and follows the recesses 124 in the dispensing sheet 120. The annular flange 160 can be discontinuous or comprised of a plurality of separate flanges extending downwardly from the perimeter of the dispensing sheet 120. When the annular flange 160 is discontinuous, the annular channel 152 can also be discontinuous and comprised of an equal plurality of mating sections.

In an alternate embodiment, the dispensing sheet 120 has a diameter that is just larger than that of the sidewalls 111 such that the annular flange 160 is disposed and slides along an exterior side of the sidewalls 111. In such an embodiment, the annular channel 152 and the rails 113 can be moved to the exterior side of the sidewalls 111 or omitted entirely.

With reference to FIGS. 10A-B, operation of the animal-food dispensing apparatus 100 is described in accordance with an embodiment of the invention. Initially, a mass of a viscous animal food is placed in the container 110 on the interior bottom surface 112. The viscous animal food can comprise, for example and not limitation, canned pet food, other foods consumable by an animal but not sold as animal food, such as peanut butter or yogurt, or medications. The dispensing sheet 120 is next installed in the cavity of the container 110 by aligning the rails 113 with the recesses 124 in the sheet 120 and placing the sheet 120 in vertical sliding relation with the container 110. The web 158 of the dispensing sheet 120 is placed into contact with the mass of animal food by gravity or by depressing of the sheet 120 into the container 110. Lapping or licking of an animal's tongue during eating of the animal food depresses the sheet 120 into the container 110 against the viscous food to extrude the animal food through the openings 122 as described above. Forces might also be applied by other means to extrude or dispense animal food or other materials through the sheet 120, such as, for example, by a user depressing the sheet 120 using a finger or hand.

As the dispensing sheet 120 travels downwardly along the sidewalls 111, the annular flange 160 contacts and slides along the sidewalls 111. The interaction of the annular flange 160 and the sidewalls 111 aids to stabilize the dispensing sheet 120 against pivotal movement away from a plane that is aligned generally orthogonal to the direction of travel of the sheet 120. As such, the dispensing sheet 120 resists pivoting out of proper alignment when forces are applied unevenly across the web 158 thereof. The annular flange 160 may also aid to retain or direct the mass of animal food toward the center of the sheet 120 as the sheet 120 descends into the container 110.

As the dispensing sheet 120 nears the bottom surface 112, the annular flange 160 is received by the annular channel 152. The annular flange 160 contacts the lower wall 156 of the channel 152 substantially simultaneously with the web 158 of the sheet 120 contacting the concave portion 150 of the bottom surface 112 of the container 110. The web 158 is thus received on the concave portion 150 having dispensed substantially all of the mass of animal food through the sheet 120.

The annular flange 160 might be configured with a length that is shorter than the depth of the channel 152 so that the flange 160 does not contact the lower wall 156 of the channel 152.

Insertion of the annular flange 160 into the annular channel 152 also displaces a portion of the animal food that has advanced into the channel 152. The displacement can thus return the animal food to the concave portion 150 for dispensing through the sheet 120.

It is to be understood that a wide variety of foods consumable by an animal can be used with the dispensing apparatus disclosed herein. It is foreseen that various foods may be specifically formulated to have a viscosity, which allows an animal to lap the food out of the dispenser at a rate that maintains the animal's attention for a period sufficient to allow the owner or caretaker to complete a task. For example, the dispenser may be used to distract the animal while the owner or caretaker eats a meal. Medications might also be similarly configured to enable provision of the medication to the animal using the animal food dispensing apparatus 10, 100.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. An apparatus for dispensing viscous food to an animal using its tongue, the apparatus comprising:
    a container for holding the viscous food, the container having a cavity formed by a bottom wall, a sidewall, and an open top;
    a dispensing sheet having a web with a concave profile that curves downwardly toward a center of the web and toward the bottom wall of the container, the web having a plurality of apertures formed therethrough; and
    a flange extending from the perimeter of the web downwardly in the direction of the concave profile, the flange being slideable along the sidewall to enable movement of the sheet axially relative to the cavity in a direction substantially parallel to the flange, the flange resisting pivotal movement of the web.

2. The apparatus of claim 1, further comprising:
    an annular channel disposed about the perimeter of the bottom wall of the cavity and configured to receive the flange of the dispensing sheet.

3. The apparatus of claim 2, wherein the annular channel has a depth that is equal to or greater than the length of the flange, and wherein receipt of the flange by the annular channel enables the web of the sheet to contact the bottom wall of the cavity.

4. The apparatus of claim 1, wherein the bottom wall has a concave profile that curves away from the open top and conforms to the concave profile of the web of the dispensing sheet.

5. The apparatus of claim 1, wherein one or more of the plurality of apertures in the web are located proximate the center of the web.

6. The apparatus of claim 1, wherein the concave profile of the web enables the tongue of an animal to advance toward and across the center of the dispensing sheet in a downward arcuate path, and wherein forces applied by the animal's tongue move the sheet toward and against a portion of the viscous food disposed between the web and the bottom wall of the cavity to extrude at least a portion of the food through at least one of the plurality of apertures.

7. The apparatus of claim 1, further comprising:
guide rails disposed along the sidewall; and
conforming recesses formed in the perimeter of the dispensing sheet, the recesses receiving the guide rails to guide vertical sliding movement of the sheet within the cavity of the container.

8. The apparatus of claim 1, further comprising:
a lid that sealably covers the open top.

9. The apparatus of claim 1, further comprising:
a collar that threadably engages the container proximate the open top, the collar being configured to retain the sheet within the cavity.

10. The apparatus of claim 1, wherein an exterior sidewall of the container is tapered to provide a diameter of a base of the container that is greater than an exterior top diameter in order to inhibit the container from toppling.

11. The apparatus of claim 10, wherein the base of the container is disproportionately weighted in order to further inhibit the container from toppling.

12. The apparatus of claim 1 in combination with a quantity of the viscous animal food positioned in the container between the bottom wall and the web of the dispensing sheet, at least a portion of the food being extruded through one or more of the apertures in the sheet by pressing of the tongue of the animal against the sheet toward the bottom wall of the container.

13. An apparatus for dispensing viscous food to an animal using its tongue, the apparatus comprising:
a container having a hollow interior formed by a closed first end, a sidewall, and an open second end, the first end being concave and extending in a direction away from the open second end;
a dispensing sheet having a web and a flange, the web including a plurality of apertures extending through the thickness of the web and having a concave trough profile that curves downwardly away from a periphery of the web towards the closed first end, the web being configured to conform to the first end of the container, the flange extending from the periphery of the web downwardly toward the first closed end and being slideable along the sidewall; and
a channel disposed about the perimeter of the closed second end and configured to receive the flange therein.

14. The apparatus of claim 13, further comprising:
a plurality of guide rails disposed along an interior surface of the sidewall and extending along at least a portion of the length of the sidewall between the first and second ends; and
a plurality of conforming recesses in the perimeter of the sheet, the recesses receiving the guide rails for sliding movement of the sheet along the length of the sidewall and within the interior of the container.

15. The apparatus of claim 13, wherein the flange resists pivotal movement of sheet out of a plane that is substantially transverse to the length of the sidewall between the first and second ends.

16. The apparatus of claim 13, further comprising:
a portion of viscous food disposed in the container between the first end and the web of the sheet, the portion being extruded through one or more of the apertures in the sheet by movement of the sheet toward the first end in response to the tongue of the animal pressing against the sheet.

17. An apparatus for dispensing a viscous material, the apparatus comprising:
a container having a hollow interior formed by a closed first end, a sidewall, and an open second end, the first end having a depressed central portion that slopes in a direction away from the open second end and a channel extending about the perimeter of the central portion and between the central portion and the sidewall; and
a dispensing sheet having a web and a flange, the web including a plurality of apertures extending through the thickness thereof, the web having a depressed profile that slopes away from the perimeter of the web and toward the first end of the container, the web being configured to conform to the central portion of the first end of the container and being moveable toward and into contact with the first end of the container, the flange extending from the perimeter of the web toward the channel and being configured for receipt by the channel.

18. The apparatus of claim 17, further comprising:
a plurality of guide rails disposed along an interior surface of the sidewall and extending along at least a portion of the length of the sidewall between the first and second ends; and
a plurality of conforming recesses in the perimeter of the sheet, the recesses receiving the guide rails and stabilizing movement of the sheet within the container.

19. The apparatus of claim 17, wherein the flange is slideable along the sidewall and resists pivotal movement of the sheet out of a plane that is substantially transverse to the length of the sidewall between the first and second ends.

20. The apparatus of claim 17, wherein the concave profile of the web enables the tongue of an animal to advance toward and across the center of the dispensing sheet in a downward arcuate path, and wherein forces applied by the animal's tongue move the sheet toward and against a portion of the viscous food disposed between the web and the bottom wall of the cavity to extrude at least a portion of the food through at least one of the plurality of apertures.

* * * * *